United States Patent
Suh et al.

(10) Patent No.: US 8,170,144 B2
(45) Date of Patent: May 1, 2012

(54) DISTRIBUTED TRANSLATOR WITH RECEIVED SIGNAL SYNCHRONIZATION AND METHOD THEREOF

(75) Inventors: Young-Woo Suh, Seoul (KR); Tae-Hoon Kwon, Seoul (KR); Ha-Kyun Mok, Seoul (KR); Jong Soo Seo, Seoul (KR); Jin Yong Choi, Gyeonggi-do (KR)

(73) Assignee: Korean Broadcasting System, Seoul (KR)

( * ) Notice: Subject to any disclaimer, the term of this patent is extended or adjusted under 35 U.S.C. 154(b) by 749 days.

(21) Appl. No.: 12/259,895

(22) Filed: Oct. 28, 2008

(65) Prior Publication Data

US 2009/0110133 A1    Apr. 30, 2009

(30) Foreign Application Priority Data

Oct. 29, 2007  (KR) .................. 10-2007-0109143
Jan. 22, 2008  (KR) .................. 10-2008-0006618

(51) Int. Cl.
  *H04L 27/00*    (2006.01)
(52) U.S. Cl. ...................................... 375/316
(58) Field of Classification Search .......... 375/270, 375/277, 316, 354, 357, 369, 372, 373, 374; 370/395.62, 507; 455/265, 47, 109, 204; 702/89; 713/375, 400

See application file for complete search history.

(56) References Cited

U.S. PATENT DOCUMENTS

| | | | | |
|---|---|---|---|---|
| 6,650,374 | B2* | 11/2003 | Choi et al. | 348/723 |
| 7,313,208 | B2* | 12/2007 | Frahm et al. | 375/350 |
| 7,487,533 | B2* | 2/2009 | Kuh | 725/116 |
| 2002/0085118 | A1* | 7/2002 | Harris et al. | 348/473 |

FOREIGN PATENT DOCUMENTS

| | | |
|---|---|---|
| KR | 20010017590 A | 5/2001 |
| KR | 20020039738 A | 7/2002 |
| KR | 20030076097 A | 10/2003 |
| KR | 20060105326 A | 11/2006 |

* cited by examiner

*Primary Examiner* — Sam K Ahn
(74) *Attorney, Agent, or Firm* — Guntin Meles & Gust, PLC; Pablo Meles

(57) ABSTRACT

A distributed translator and an operation method of the distributed translator are proposed. The distributed translator includes: a demodulator demodulating a received signal to extract a transport stream and synchronization information from the received signal; a modulator generating an output frame based on the synchronization information to modulate the output frame; and a transmitter transmitting the modulated output frame according to a transmission timing.

10 Claims, 11 Drawing Sheets

DISTRIBUTED TRANSLATOR WITH RECEIVED SIGNAL SYNCHRONIZATION AND METHOD THEREOF

CROSS-REFERENCE TO RELATED APPLICATIONS

This application claims priority from Korean Patent Application No. 10-2007-0109143, filed on Oct. 29, 2007, and priority from Korean Patent Application No. 10-2008-0006618, filed on Jan. 22, 2008, in the Korean Intellectual Property Office, the entire disclosures of which are incorporated herein by reference.

BACKGROUND OF THE INVENTION

1. Field of the Invention

The present invention relates to the single frequency translator in a digital television (TV) broadcasting network, and more particularly, a distributed translator that can construct a data frame using information that is extracted from a received signal, instead of using an external control signal, and reset a memory of an encoder to thereby match data synchronization.

2. Description of Related Art

Generally, a translator may be installed in a region where weak signals are received from a main transmitter. The installed translator functions to solve reception difficulties and widen a transmission region of the main transmitter.

FIG. 1 is a block diagram illustrating a configuration of a general Advanced Television System Committee (ATSC) digital television (TV) translator according to a conventional art.

Referring to FIG. 1, the general digital TV translator includes a Vestigial Side Band (VSB) demodulation end 101 that receives a signal from a main transmitter (not shown) and demodulates the received signal, and a modulation end 103 that re-modulates the demodulated signal and transmits the re-modulated signal.

The VSB demodulation end 101 includes a tuner 105, an analog-to-digital (A/D) converter 107, and a VSB decoder 109.

The tuner 105 may receive a radio frequency (RF) signal from the main transmitter to select a desired channel.

The A/D converter 107 may convert an analog signal corresponding to the selected channel to a digital signal.

The VSB decoder 109 may perform VSB decoding for the digital signal to recover the signal to a transport stream transmitted from a transmission end.

The modulation end 103 includes a VSB modulator 111, an up converter 115, and a frequency synthesizer 113.

The transport stream may be input in the VSB modulator 111 to thereby go through a modulation process such as encoding, interleaving, and the like.

The up converter 115 may up convert a signal that is modulated by the VSB modulator 111.

FIG. 2 illustrates a configuration of a distributed translator using a particular packet according to the conventional art.

A distributed translation system according to the conventional art may insert a distributed transmission packet in a transport stream of a studio and may constitute a distributed transmitter and a distributed translator using distributed transmission packet information.

As shown in FIG. 2, the distributed translator using the distributed transmission packet information may include an RF receiving antenna 3, a band pass filter (BPF) 41, a high power amplifier (HPA) 62, another BPF 63, and an RF transmitting antenna 7. The distributed translation system using the distributed transmission packet information may only amplify an RF signal received by the RF receiving antenna 3 and then transmit the amplified RF signal.

Also, the distributed translation system using the distributed transmission packet information may remove an adjacent channel signal in the received RF signal using the BPF 41 and then amplify the RF signal using the HPA 62. The amplified RF signal may have channel noise included in the received RF signal. The adjacent channel signal that may be caused by the HPA may be removed using a channel filter. A signal in which the adjacent channel signal is removed may be transmitted.

The distributed translation system according to the conventional art may need to insert a distributed transmission packet in a transport stream. Therefore, there is a need for modifying the distributed translator and the broadcasting transmission system shown in FIG. 1.

FIG. 3 illustrates a configuration of a distributed translator that demodulates a symbol and then retransmits the symbol in a baseband according to the conventional art.

The distributed translator may demodulate a transmission symbol of a main transmitter up to a symbol level and convert the transmission signal to an RF signal and then transmit the converted RF signal.

As shown in FIG. 3, the distributed translator system that demodulates the transmission signal of the main transmitter up to the symbol level and converts the transmission signal to the RF signal and then translates the converted RF signal may include an RF receiving antenna 3, a BPF 41, an amplifier 42, a mixer 43 for an intermediate frequency (IF) conversion, an oscillator 45, an IF BPF 44, another mixer 61, an HPA 62, a BPF 63, and an RF transmitting antenna 7. The distributed translator may convert an RF signal received by the RF receiving antenna 3 to an IF and then convert the IF to the RF signal, amplify the converted RF signal and then transmit the amplified RF signal.

The conventional distributed translation system may require a modification or change for a transmitter-and-studio facility and may be inapplicable in a communication environment with a poor reception condition.

SUMMARY OF THE INVENTION

An aspect of the present invention provides a distributed translator that can construct a transmission data frame using information that is extracted from a received signal, instead of using an external control signal, and a method of operating the distributed translator.

Another aspect of the present invention also provides a distributed translator that can reset a memory of a Trellis coder using Global Positioning System (GPS) information and the like to thereby perform data synchronization between distributed translators, and a method of operating the distributed translator.

Another aspect of the present invention also provides a distributed translator that can adjust a transmission timing based on a delay time that is spent to generate a transmission data frame from a received data frame, and thereby can uniformly maintain the transmission timing, and a method of operating the distributed translator.

According to an aspect of the present invention, there is provided a distributed translator including: a demodulator demodulating a received signal to extract a transport stream and synchronization information from the received signal; a modulator generating an output frame based on the extracted synchronization information to modulate the generated output frame; and a transmitter transmitting the modulated output frame according to a transmission timing.

According to another aspect of the present invention, there is provided an operating method of a distributed translator, the method including: extracting synchronization information from a frame format of a received signal; constructing an output frame using the synchronization information; modulating the output frame; and transmitting the modulated output frame according to a transmission timing.

According to still another aspect of the present invention, there is provided an operating method of a distributed translator, the method including: modulating a received signal to extract a transport stream; reconstructing the transport stream as an output frame; and transmitting the output frame based on a delay time that is caused by a reconstruction of the output frame.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
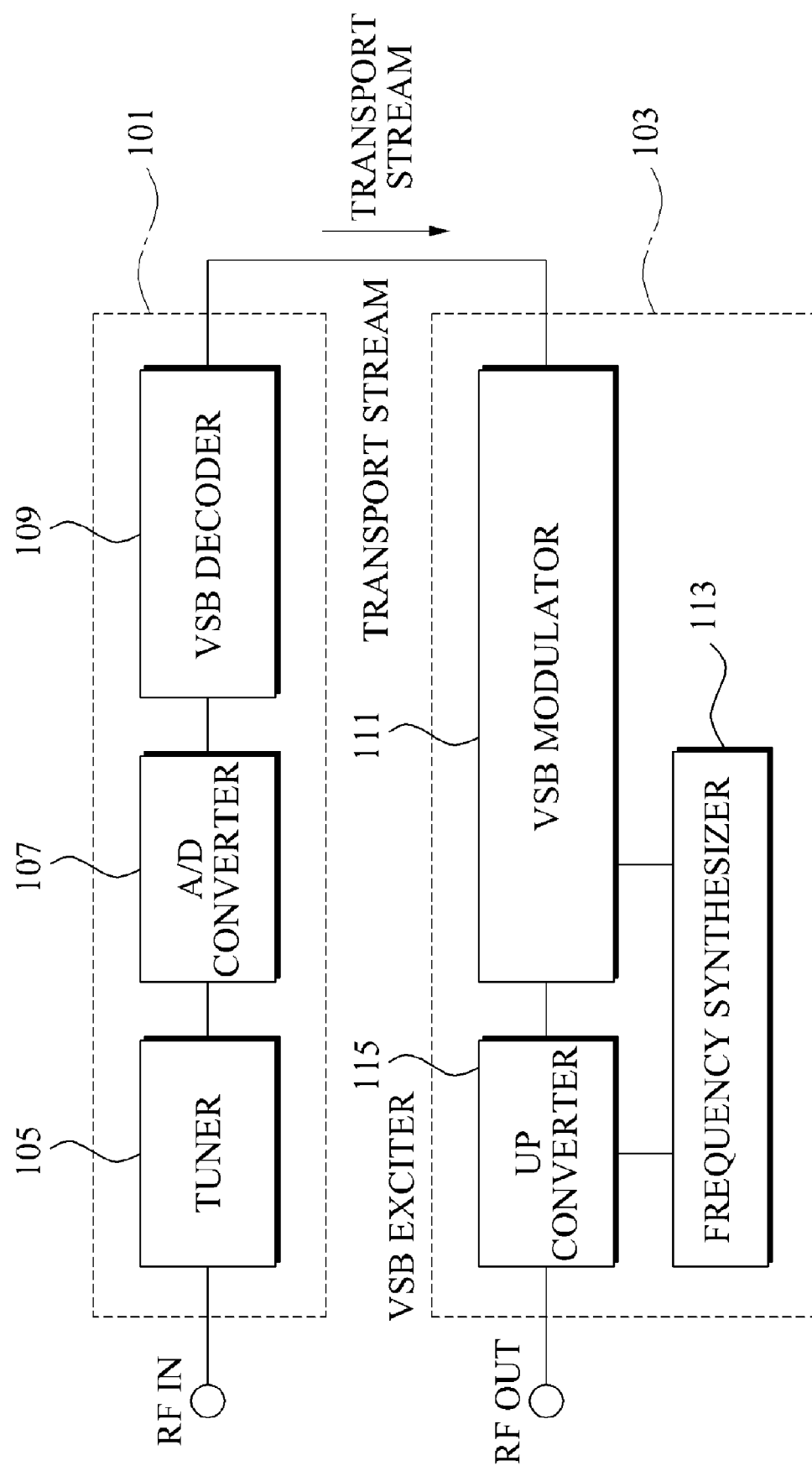
FIG. 1 is a block diagram illustrating a configuration of a general Advanced Television System Committee (ATSC) digital television (TV) translator according to a conventional art.
Figure 2:
FIG. 2 illustrates a configuration of a distributed translator using a particular packet according to the conventional art.
Figure 3:
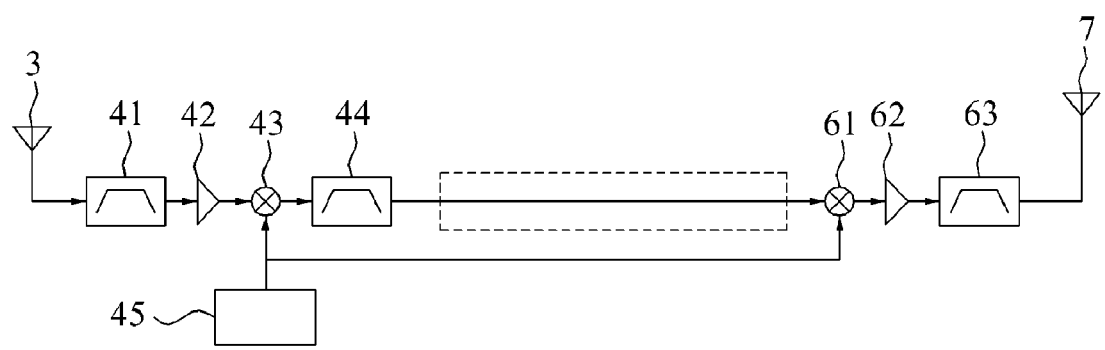
FIG. 3 illustrates a configuration of a distributed translator that demodulates a symbol and then retransmits the symbol in a baseband according to the conventional art.

According to embodiments of the present invention, it is possible to construct distributed translators using the same frequency without making any change in a transmitter-and-studio facility, which is different from a conventional scheme of inserting particular data into a transmission packet of a studio.

According to embodiments of the present invention, it is possible to perform data recovery using an error correction in a translator, which is different from a conventional scheme of recovering a symbol and retransmitting the recovered symbol. Thus, according to embodiments of the present invention, it is possible to readily construct the same channel translation network even in a place where a reception condition is poor.

According to embodiments of the present invention, it is possible to obtain frame synchronization of reception data and transmission data by partially correcting a configuration of a reception chip. Thus, it is possible to avoid complexity in configuration and to embody an economically equivalent channel translator.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

In the following description, a distributed translator may be applicable to a distributed translators that constitutes at least two translators using the same channel. The scope of the invention is not limited thereto or restricted thereby and may also be applicable to other distributed translators of performing the same principle.

Components used in the detailed descriptions and the drawings of the present invention may include an analog-to-digital (A/D) converter, an Advanced Television Systems Committee (ATSC), an even/odd field that denotes an even/odd field of an ATSC data frame, an exciter that denotes a modulation and radio frequency (RF) converter, a frame sync detector that denotes a frame synchronization detector of the ATSC data frame, a frame sync processor, a frequency synthesizer, a Global Positioning System (GPS), an intermediate frequency (IF) converter, a modulator, a pulse per second (PPS) generator, a pulse generator that denotes a GPS-based reference pulse generator, an RF, a sync that denotes synchronization, a timing processor, 10 MHz clock that denotes a reference clock from GPS and the like, a transport stream (TS) that denotes an MPEG2 transport stream, a Trellis coder, a tuner that denotes an RF selector, a TxID inserter that denotes a transmitter identification inserter, an up converter, and a Vestigial Side Band (VSB).

The basic principle of the present invention is to demodulate a received signal to a transport stream, obtain frame sync information from a frame format of the received signal, reconstruct the transport stream as an output frame, and adjust a transmission timing of the output frame based on a delay time that is caused by the reconstruction of the output frame.

Also, the basic principle of the present invention is to periodically or aperiodically reset a state memory that is referred for Trellis coding of the output frame according to a reference signal and thereby match data that is transmitted in a distributed translation interval.

Hereinafter, embodiments according to the basic principle of the present invention will be described in detail with reference to the accompanying drawings.

Figure 4:
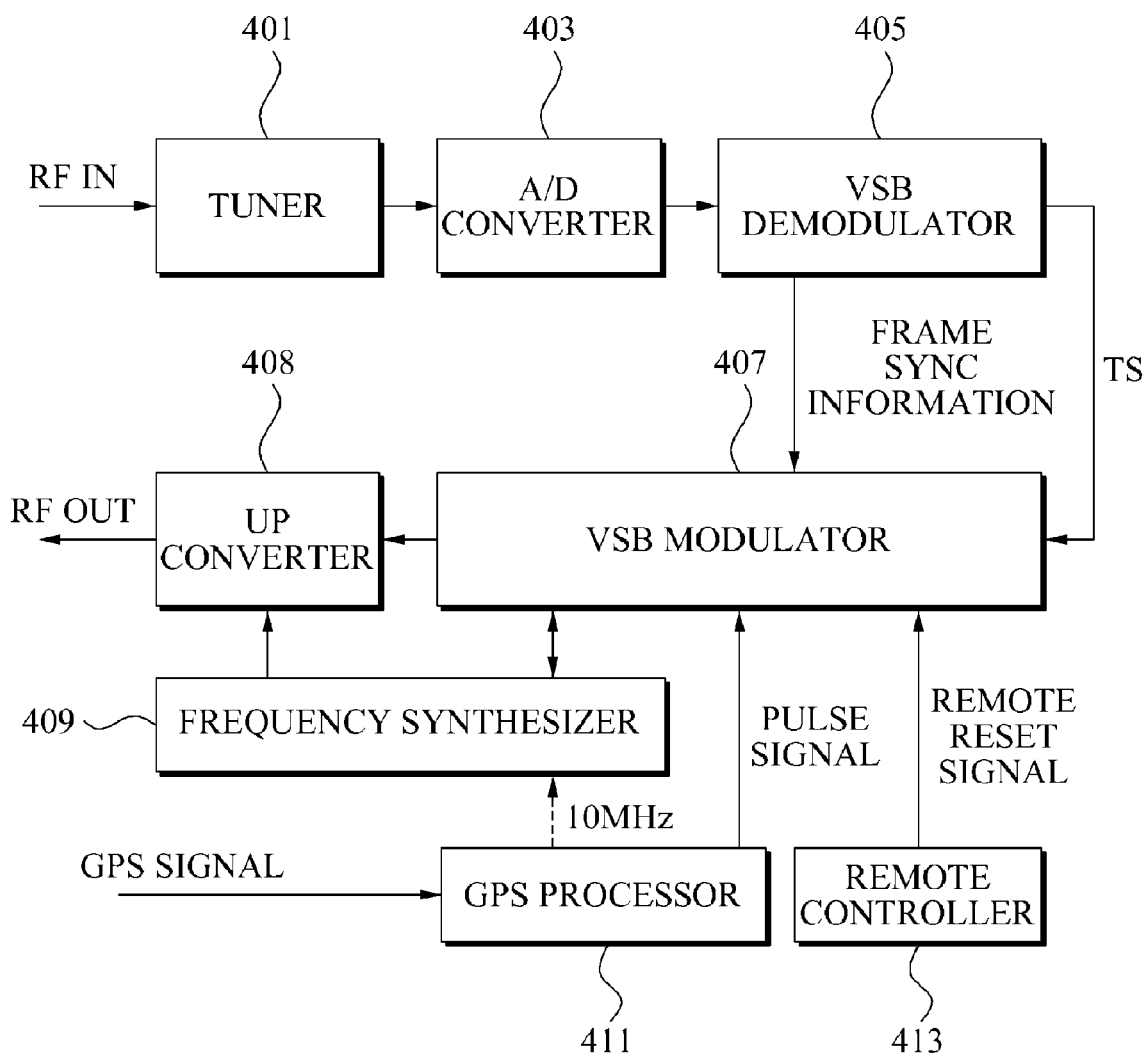
FIG. 4 is a block diagram illustrating a configuration of a distributed translator according to an embodiment of the present invention.

FIG. 4 is a block diagram illustrating a configuration of a distributed translator according to an embodiment of the present invention.

Referring to FIG. 4, the distributed translator includes a tuner 401, an A/D converter 403, a VSB demodulator 405, a VSB modulator 407, an up converter 408, a frequency synthesizer 409, a GPS processor 411, and a remote controller 413.

The tuner 401 and the A/D converter 403 may perform the same functions as the tuner 105 and the A/D converter 107 of FIG. 1.

Therefore, the tuner 401 may receive an RF signal corresponding to a selected channel to convert the RF signal to an IF signal or a baseband signal.

The A/D converter 403 may convert an analog output signal of the tuner 401 to a digital signal.

The VSB modulator 407, the up converter 408, and the frequency synthesizer 409 may be applicable to a VSB exciter of a general distributed translator.

The VSB demodulator 405 may demodulate the received signal to extract an MPEG transport stream in the received signal and extract frame sync information of the frame format of the received signal.

The frame sync information may further include field sync information associated with an even/odd field of an ATSC data frame.

The VSB demodulator 405 may include an equalizer for channel equalization, and a forward error correction (FEC) decoder.

As shown in FIG. 4, the frame sync information may be provided to the VSB modulator 407 of a VSB exciter.

The VSB modulator 407 may generate an output frame of the demodulated transport stream based on the frame sync information and perform VSB modulation for the output frame.

The up converter 408 may perform the same function as the up converter 115 of FIG. 1.

Similar to the frequency synthesizer 113 of FIG. 1, the frequency synthesizer 409 may receive a reference frequency and determine a transmit output frequency.

The GPS processor 411 may receive a GPS signal to generate a reference frequency of about 10 MHz and a pulse signal of about 1 Hz and provide the generated reference frequency and the pulse signal to the frequency synthesizer 409 and the VSB modulator 407.

The reference signal for frequency synchronization may be obtained using a frequency that is extracted from the received signal or extracted from a period of a field sync signal.

The remote controller 413 my receive an external control signal and provide the external control signal as a reference signal for resetting a state memory of an encoder.

The remote controller 413 may receive a signal for an overall remote control of the distributed translator and perform control according to the received remote control signal.

Specifically, according to an aspect of the present invention, the state memory for Trellis coding may be reset based on frame sync information, the reference signal using the pulse signal that is generated in the GPS processor 411, and the reference signal that is input from an outside.

Figure 5:
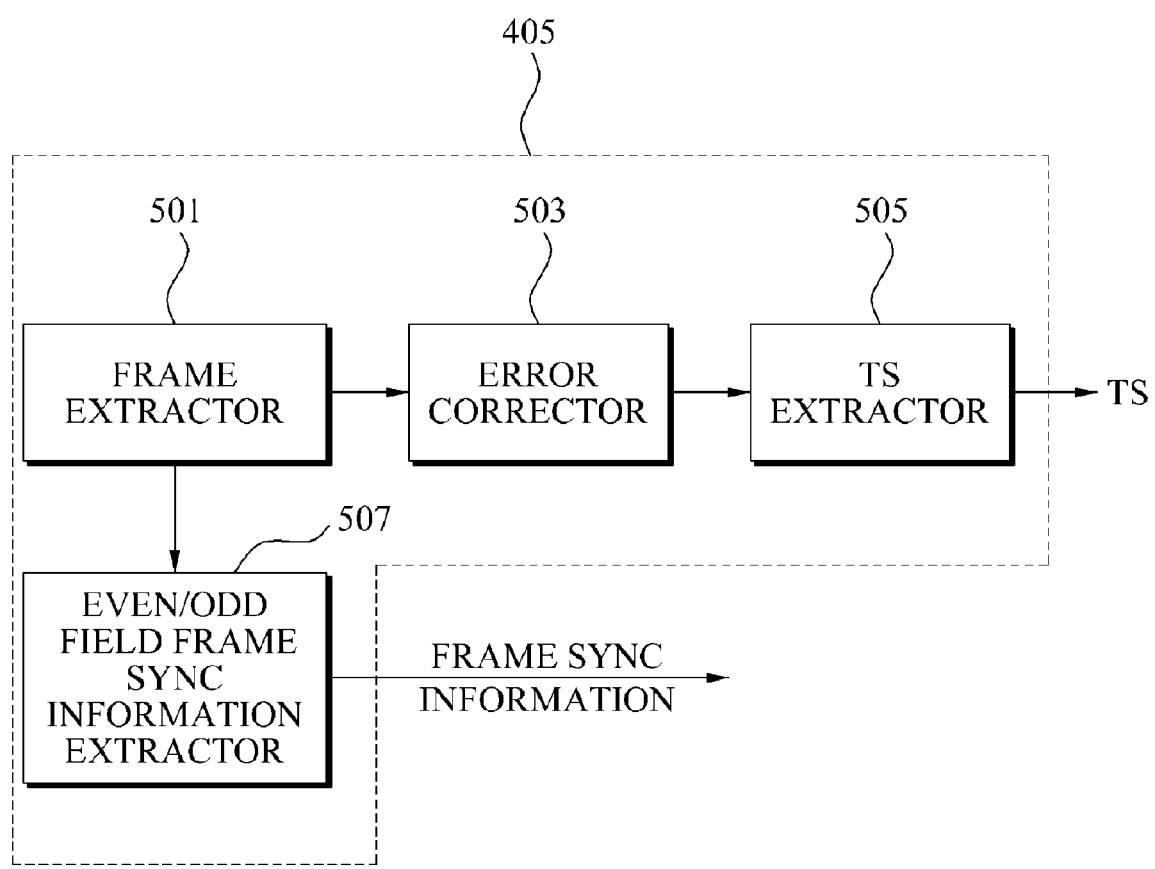
FIG. 5 is a block diagram illustrating a configuration of a Vestigial Side Band (VSB) demodulator of FIG. 4.

FIG. 5 is a block diagram illustrating a configuration of the VSB demodulator 405 shown in FIG. 4.

Referring to FIG. 5, the VSB demodulator 405 includes a frame extractor 501, an error corrector 503, a transport stream (TS) extractor 505, and a frame sync information extractor 507.

The frame extractor 501 may extract a frame format of a received signal.

The error corrector 503 may correct an error in the received signal.

The TS extractor 505 may decode the received signal in which the error is corrected by the error corrector 503 to thereby extract a transport stream.

The frame extractor 501, the error corrector 503, and the TS extractor 505 may constitute a VSB decoder.

The VSB demodulator 405 may include an equalizer, a Trellis decoder, a data de-interleaver, an RS decoder, a de-randomizer, and the like. The error correction may be performed using the RS decoder. In the case of a scheme of retransmitting a symbol signal in the conventional art, the scheme does not employ the RS decoder. Therefore, according to an aspect of the present invention, in comparison to the conventional scheme of retransmitting the symbol signal, a carrier-to-noise (C/N) ratio may be superior by about 3 dB.

The frame sync information extractor 507 may extract frame sync information of an even/odd field from the frame format of the received signal that is extracted via the frame extractor 501 and provide the extracted frame sync information to the VSB modulator 407.

Figure 6:
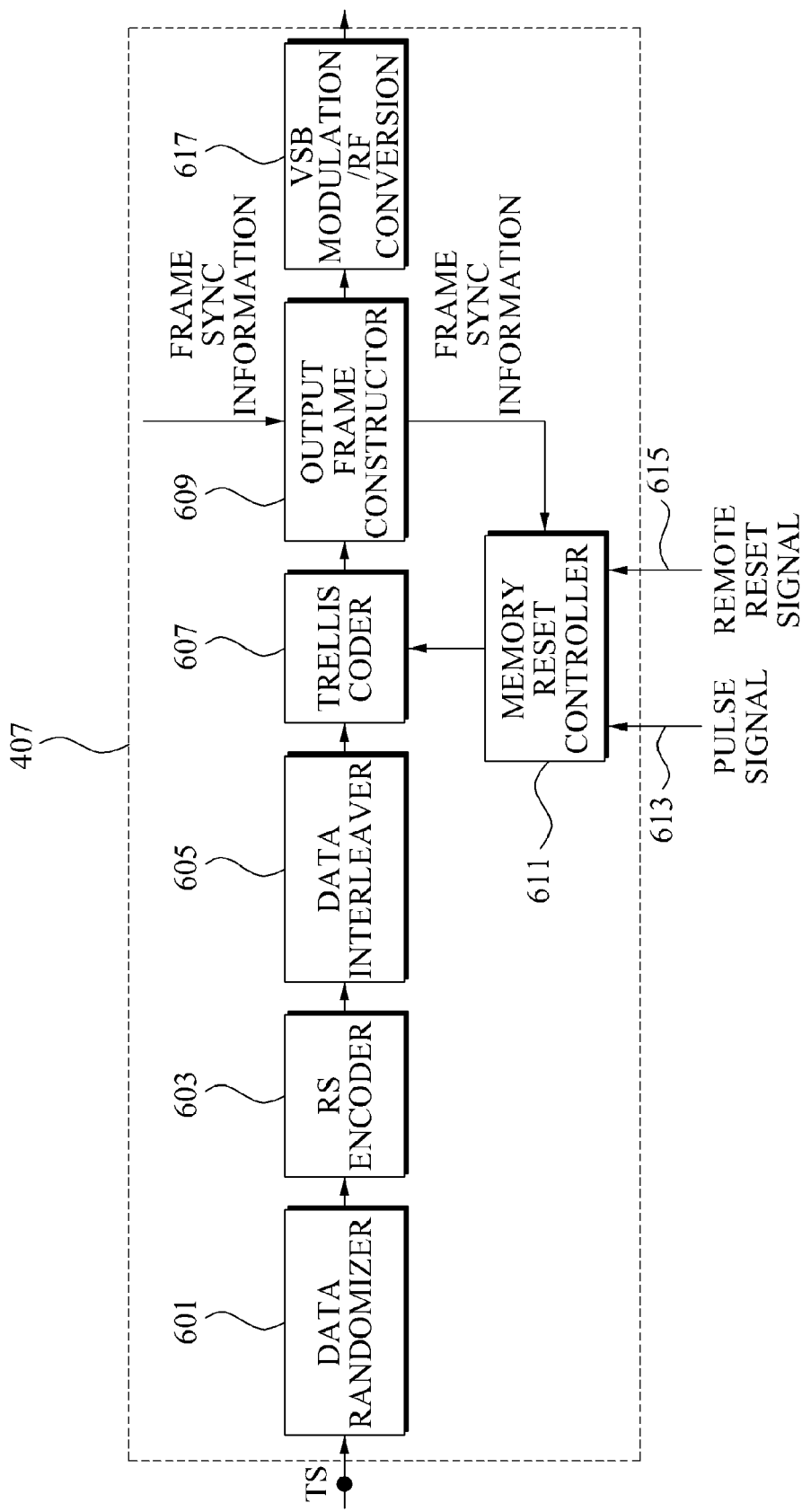
FIG. 6 is a block diagram illustrating a configuration of a VSB modulator of FIG. 4.

FIG. 6 is a block diagram illustrating a configuration of the VSB modulator 407 shown in FIG. 4.

Referring to FIG. 6, the VSB modulator 407 may include a data randomizer 601, an RS encoder 603, a data interleaver 605, a Trellis coder 607, an output frame constructor 609, a VSB modulation/RF conversion 617, and a memory reset controller 611.

The data randomizer 601, the RS encoder 603, and the data interleaver 605 may be included in a general VSB modulation unit and thus further detailed descriptions related thereto will be omitted.

The Trellis coder 607 may perform Trellis coding for a transport stream.

The memory reset controller 611 may function to periodically or aperiodically reset a state memory (not shown) that is included in the Trellis coder 607.

Specifically, the memory reset controller 611 may periodically reset the state memory based on the frame sync information.

Also, the memory reset controller 611 may generate a reference signal in order to reset a state memory in a particular time zone based on a pulse signal 613 that is provided from the GPS processor 411.

The reference signal may be a remote control signal 615 that is input from the remote controller 413.

Therefore, the memory reset controller 611 may control three state memories of the Trellis coder 607 of an ATSC standard to be reset based on the reference signal for reset of the state memory.

The output frame constructor 609 may receive frame sync information of the even/odd field that is extracted from the frame format of the received signal and store the received frame sync information.

The frame sync information may be provided to the memory reset controller 611 and be used as a signal to reset the state memory and may also be used as sync information for constructing an output frame.

The output frame constructor 609 may add a field sync signal for each TS signal 313 frame in a 188-byte format.

The VSB modulation/RF conversion 617 may perform signal processing such as pilot insertion, VSB filtering, RF up conversion, and the like to thereby perform VSB modulation for the output frame.

Figure 7:
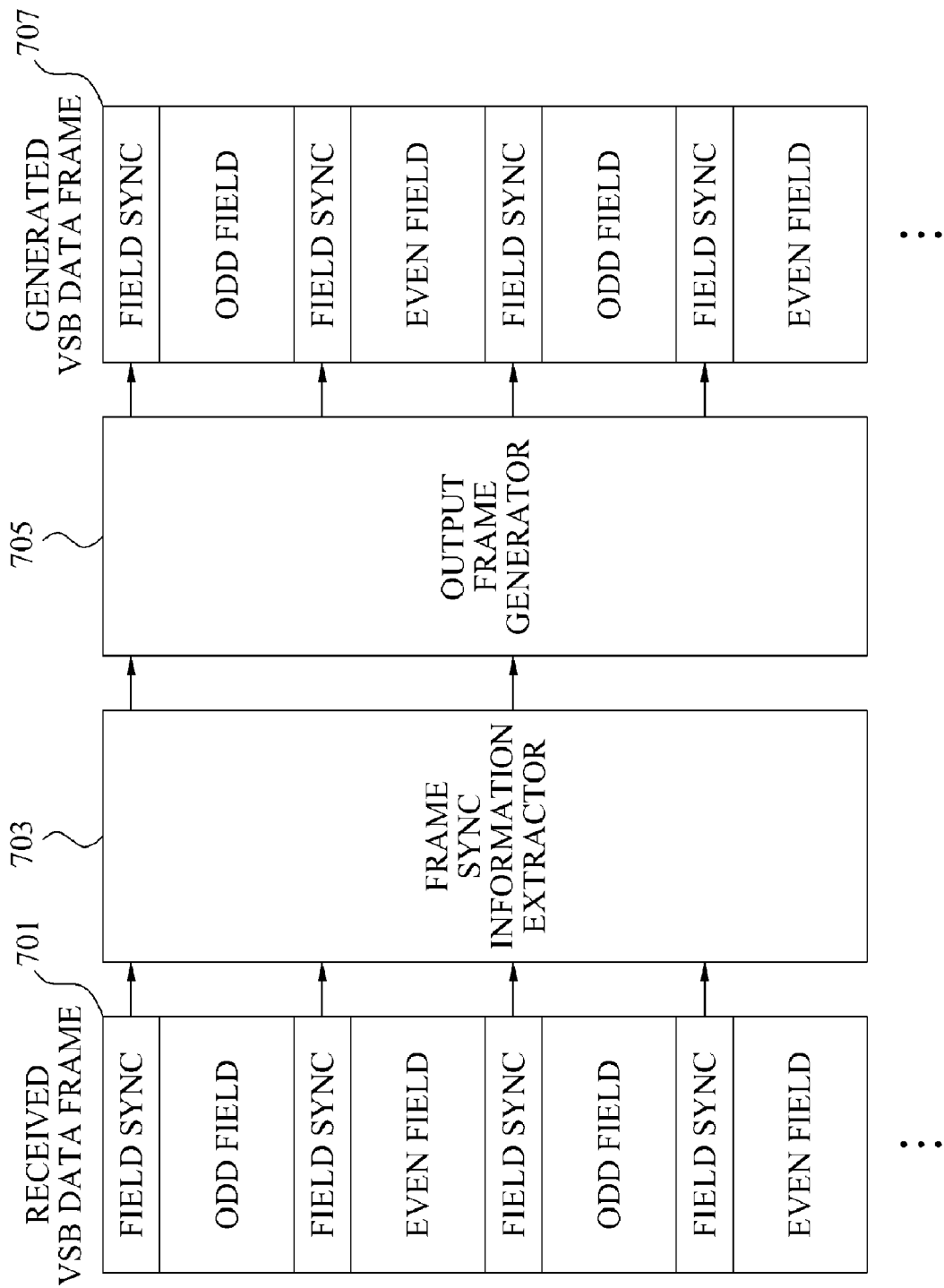
FIG. 7 illustrates an example of extracting frame synchronization information and constructing an output frame according to an embodiment of the present invention.

FIG. 7 illustrates an example of extracting frame sync information and constructing an output frame according to an embodiment of the present invention.

Referring to FIG. 7, a frame sync information extractor 703 may extract a field sync signals from a temporal flow of a received VSB data frame 701.

The extracted field sync signals may be provided to an output frame generator 705.

The output frame generator 705 may generate a VSB data frame format 707 using the field sync signals.

Accordingly, an MPEG transport stream may be in a new output frame format using the field sync signals.

Figure 8:
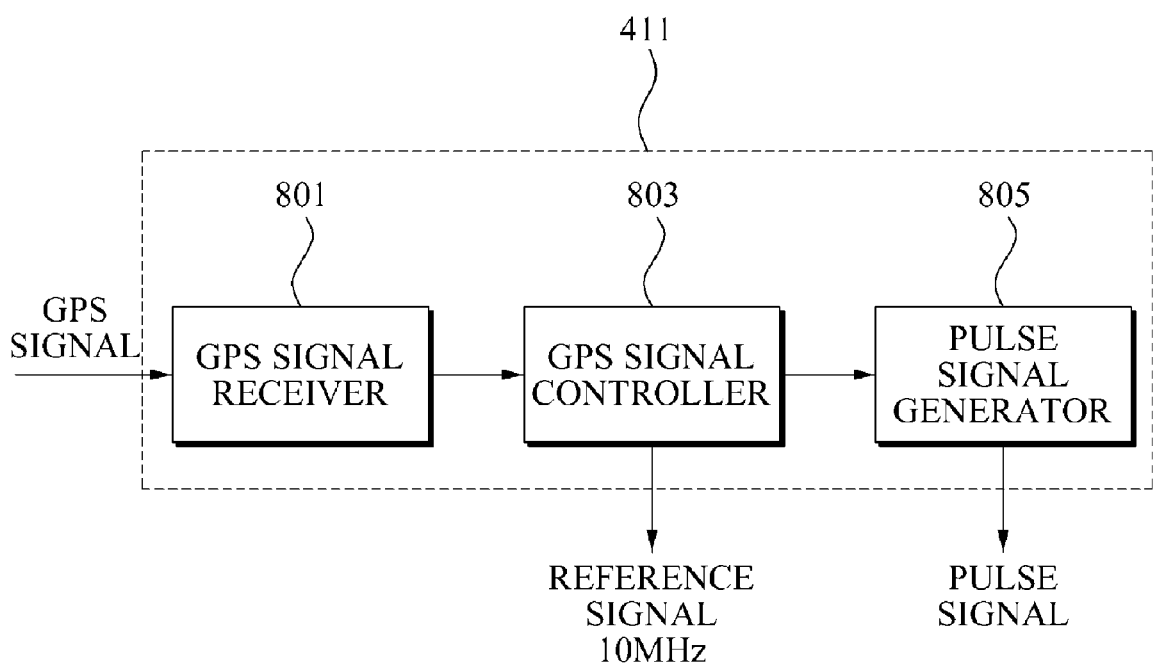
FIG. 8 is a block diagram illustrating a configuration of a Global Positioning System (GPS) processor shown in FIG. 4.

FIG. 8 is a block diagram illustrating a configuration of the GPS processor 411 shown in FIG. 4.

Referring to FIG. 8, the GPS processor 411 includes a GPS signal receiver 801 for receiving a GPS signal, a GPS signal controller 803, and a pulse signal generator 805 for generating a 1 Hz pulse signal from the GPS signal.

As described above, a reference signal of about 10 MHz may be used to determine a transmit output frequency. All the frequencies used for a modulation process may be synchronized with the reference signal of about 10 MHz.

When using a GPS, it is possible to obtain the same GPS 10 MHz reference clock at all the transmission points.

The reference clock for frequency synchronization may be obtained using a frequency that is extracted from the received signal or extracted from a period of a field sync signal.

Thus, it is possible to achieve frequency synchronization using the obtained reference clock. This is a general scheme of matching frequencies of a transmitter and a translator that constitute a Single Frequency Network (SFN).

Figure 9:
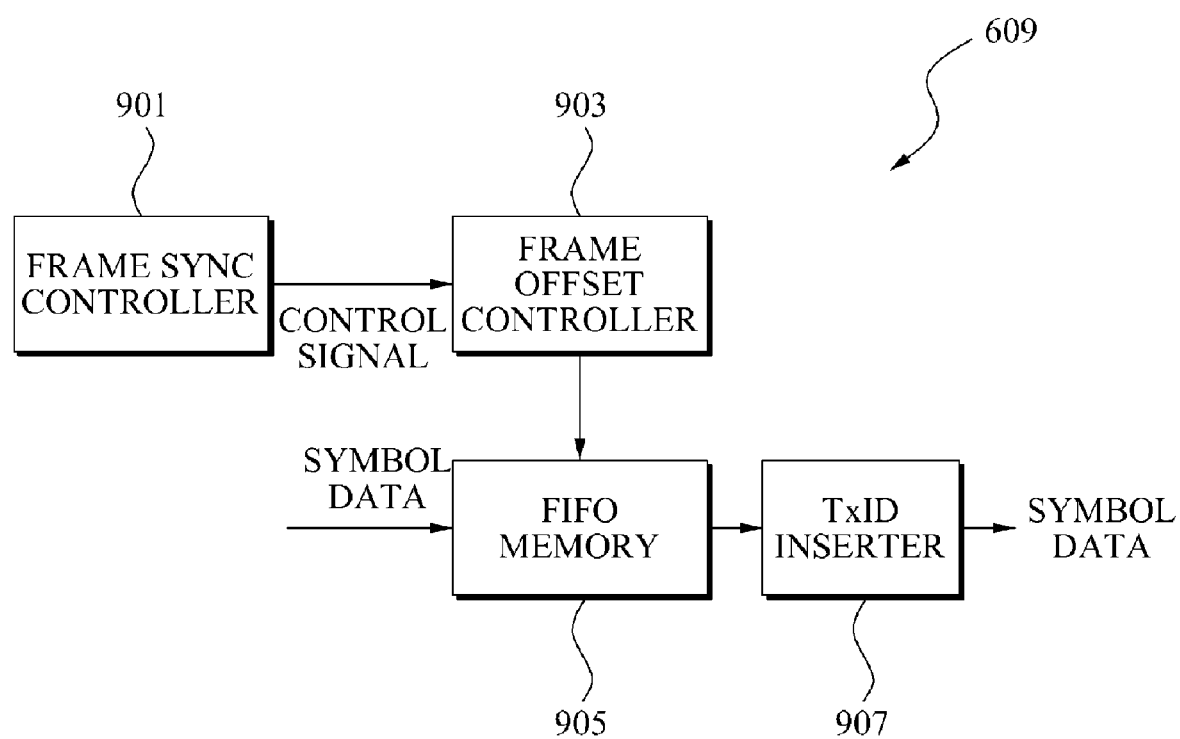
FIG. 9 is a block diagram illustrating a configuration of a transmission timing adjusting apparatus according to an embodiment of the present invention.

FIG. 9 is a block diagram illustrating a configuration of a transmission timing adjusting apparatus according to an embodiment of the present invention.

The transmission timing adjusting apparatus may be included in a detailed configuration of the output frame constructor 609 of FIG. 6. Also, the transmission timing adjusting apparatus may be included in a modulation module of VSB modulator to perform a function of adjusting a transmission timing.

Referring to FIG. 9, the transmission timing adjusting apparatus includes a frame sync controller 901 that outputs a frame sync control signal, a frame offset controller 903 that adjusts a frame offset according to a control signal, and a first-in first-out (FIFO) memory 905 that receives symbol data and performs a FIFO function.

The transmission timing adjusting apparatus may further include a unit (not shown) that controls a Tx timing offset according to an ATSC standard and a TxID inserter 907 that inserts a transmitter identification (TxID) according to the ATSC standard.

Figure 10:
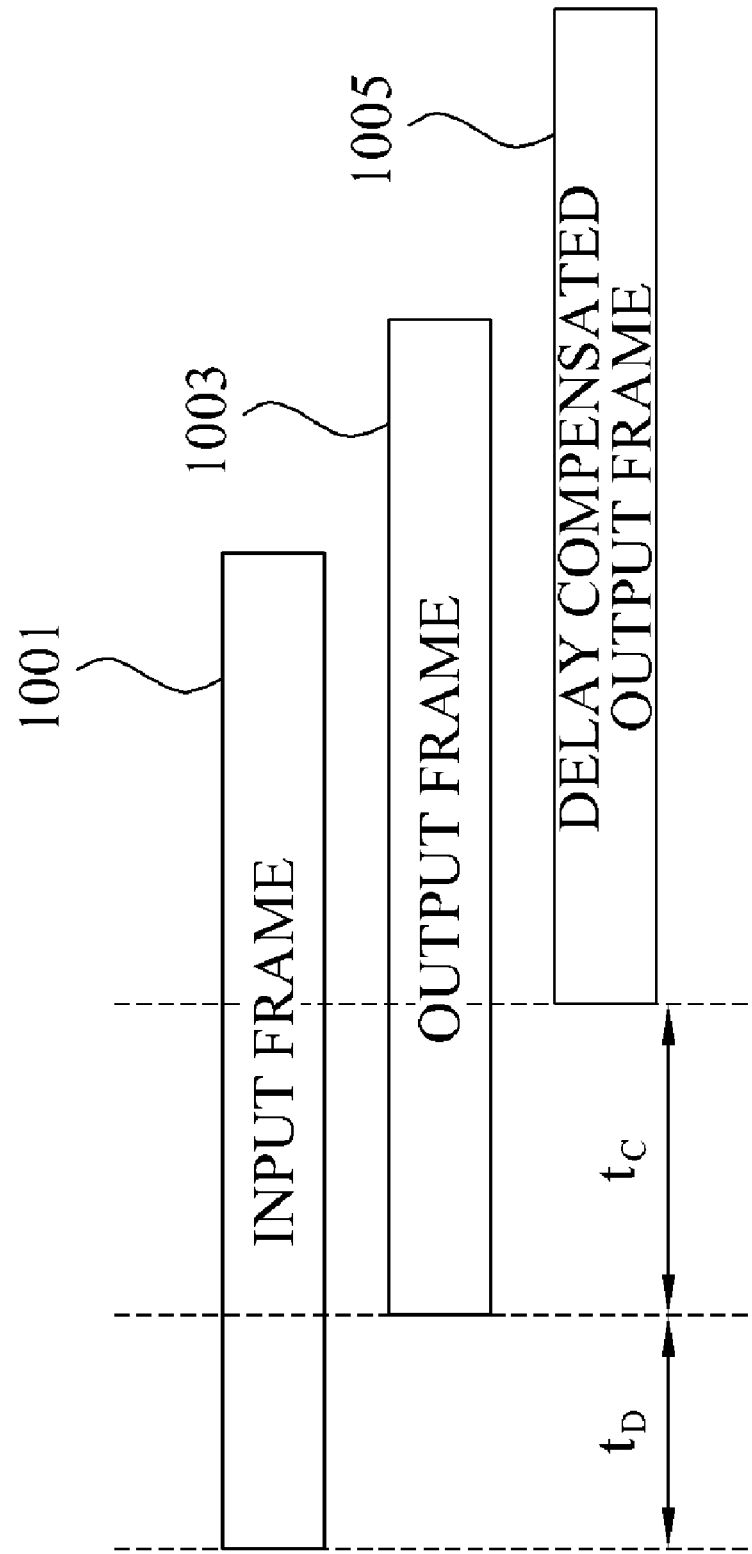
FIG. 10 illustrates a principle of adjusting a frame offset according to an embodiment of the present invention.

FIG. 10 illustrates a principle of adjusting a frame offset according to an embodiment of the present invention.

Referring to FIG. 10, $t_D$ denotes a time that is spent to extract a transport stream from an input frame 1001 and generate an output frame 1003. Specifically, $t_D$ denotes a difference between a start point of the input frame 1101 and a start point of the output frame 103.

$t_{max}$ denotes a maximum delay time that may occur in a chipset installed in each translator.

Therefore, in order to fix a transmission timing at the maximum delay time $t_{max}$, the frame offset controller 703 of FIG. 7 may control the FIFO memory 905 to delay the transmission timing by tc that is obtained by subtracting $t_D$ from the maximum delay time $t_{max}$ and thereby generate a final delay compensated output frame 1005.

As described above, according to an aspect of the present invention, a final output frame of a distributed translator may acquire a delay time of $t_{max}$ at all times.

Figure 11:
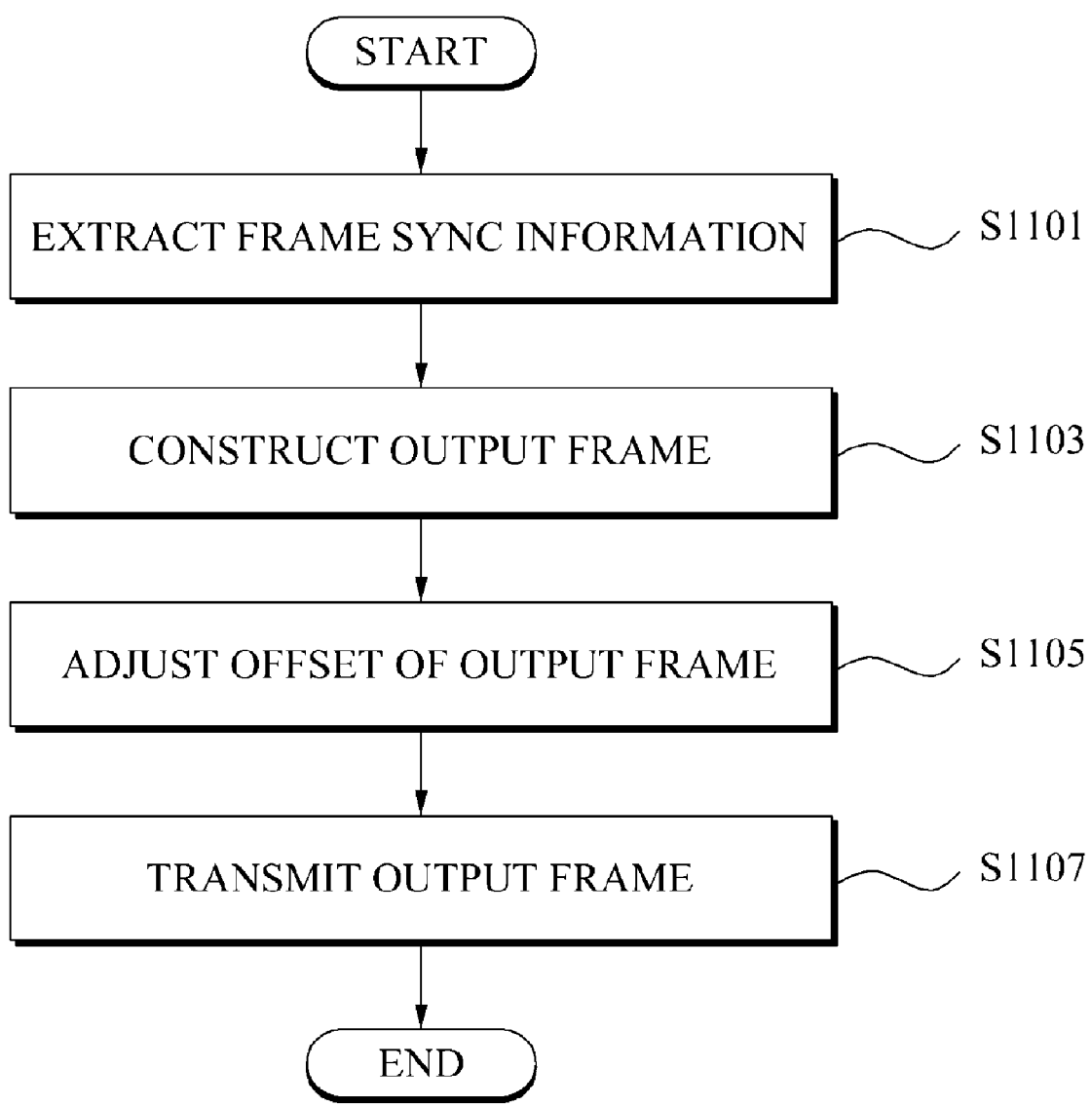
FIG. 11 is a flowchart illustrating a method of operating a distributed translator according to an embodiment of the present invention.

FIG. 11 is a flowchart illustrating a method of operating a distributed translator according to an embodiment of the present invention.

Referring to FIG. 11, the operating method of the distributed translator may include operation S1101 of extracting sync information from a frame format of a received signal, operation S1103 of constructing an output frame based on the sync information, operation S1105 of adjusting an offset of the output frame, and operation S1107 of transmitting the output frame according to a transmission timing.

In operation S1105, the offset of the output frame may be determined based on a frame offset that is obtained by subtracting a generation time of the output frame from a maximum delay time of the distributed translator.

Operation S1107 may include an operation of encoding the output frame based on state information that is reset according to the sync information and performing VSB modulation for the encoded output frame.

Figure 12:
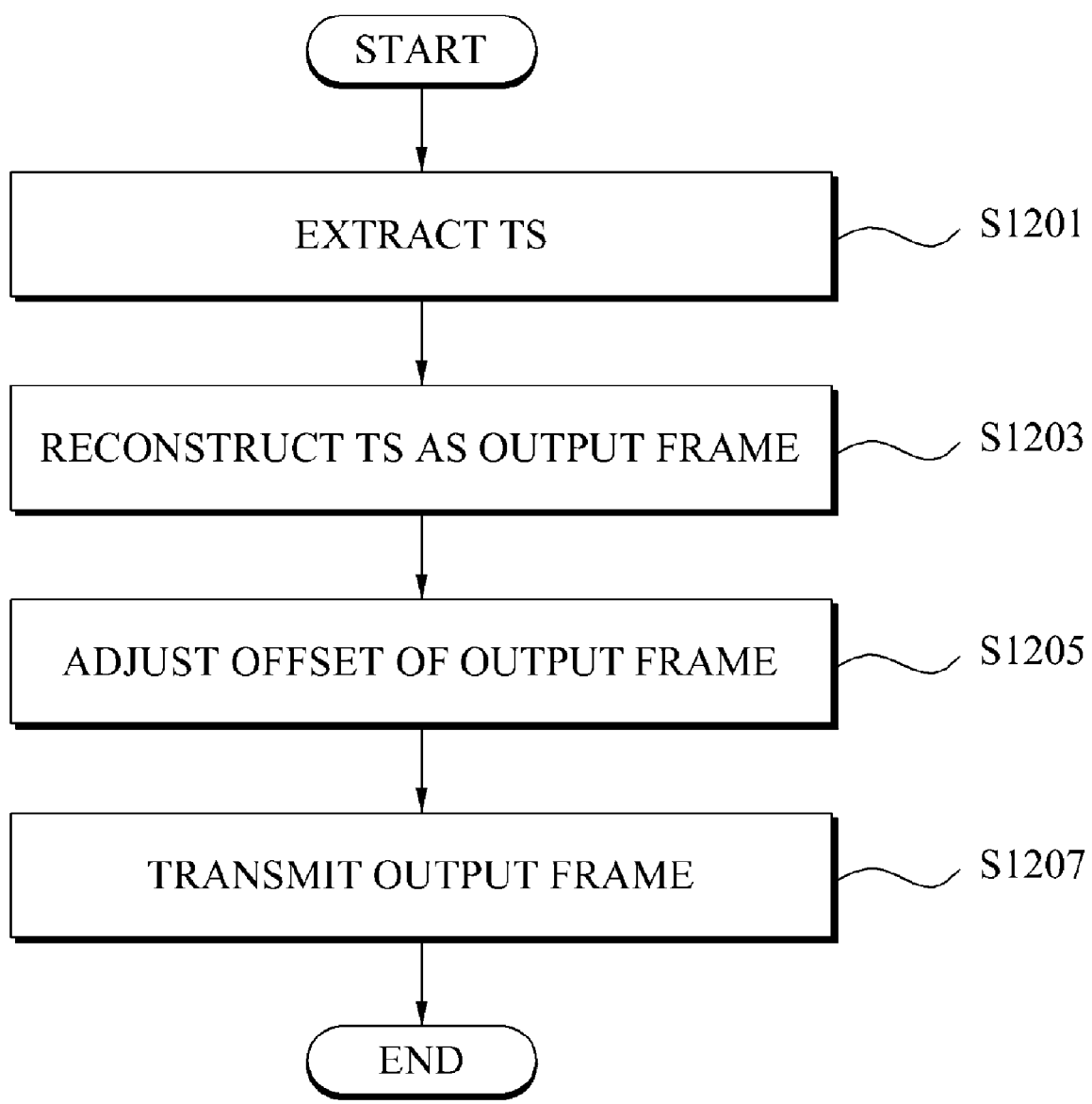
FIG. 12 is a flowchart illustrating a method of operating a distributed translator according to another embodiment of the present invention.

FIG. 12 is a flowchart illustrating a method of operating a distributed translator according to another embodiment of the present invention.

Referring to FIG. 12, the operating method of the distributed translator may include operation S1201 of demodulating a received signal to a transport stream to extract the transport stream, operation S1203 of reconstructing the transport stream as an output stream, operation S1205 of adjusting an offset of the output frame based on the reconstruction time of the output frame, and operation S1207 of transmitting the output frame according to a transmission timing.

In operation S1203, the output frame may be constructed using frame sync information of the received signal.

The distributed translator and the operating method of the distributed translator according to the aforementioned embodiments may utilize a reference frequency, generated based on a GPS signal or an extracted frame sync signal, for frequency generation of a transmission signal in order to maintain a received signal and a transmission signal as same and synchronous.

Also, the distributed translator and the operating method of the distributed translator according to the aforementioned embodiments may utilize a reset concept of a state memory of a Trellis coder and synchronization of received and output frames in order to match data between a received signal and a transmission signal.

Also, the distributed translator and the operating method of the distributed translator according to the aforementioned embodiments may adopt a FIFO buffer to adjust a frame offset in order to adjust timing of a transmission signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A distributed translator comprising:
   a demodulator demodulating a received signal to extract a transport stream and synchronization information from the received signal;
   a modulator generating an output data frame based on the synchronization information to modulate the output frame; and
   a transmitter transmitting the modulated output frame according to a transmission timing.

2. The distributed translator of claim 1, wherein the demodulator comprises:
- an error correction unit correcting an error in the received signal;
- a transport stream extractor decoding the received signal in which the error is corrected to thereby extract a transport stream in the received signal; and
- a synchronization information detector extracting field synchronization information from a frame format of the decoded received signal.

3. The distributed translator of claim 1, wherein the modulator comprises:
- an encoder performing Trellis coding for the extracted transport stream;
- an output frame generator generating an output frame of the encoded transport stream based on the synchronization information; and
- a memory reset unit resetting a state memory that is included in the encoder according to a reference signal.

4. The distributed translator of claim 3, wherein the synchronization information is field synchronization information that is extracted from a frame format of the received signal.

5. The distributed translator of claim 3, wherein the reference signal is field synchronization information that is extracted from a frame format of the received signal.

6. The distributed translator of claim 3, wherein the reference signal is any one of a signal that is generated using a Global Positioning System (GPS) pulse signal or a signal that is input from an external source.

7. The distributed translator of claim 1, wherein the transmission timing is determined based on a frame offset that is obtained by subtracting a generation time of the output frame from a maximum delay time of the distributed translator.

8. An operating method of a distributed translator, the method comprising:
- extracting synchronization information from a frame format of a received signal;
- constructing an output frame based on the synchronization information;
- modulating the output frame;
- transmitting the modulated output frame according to a transmission timing: and
- wherein the constructing of the output frame encodes a transport stream based on state information that is reset based on the synchronization information, and constructs an output frame of the encoded transport stream according to the synchronization information.

9. The method of claim 8, wherein the transmission timing is determined based on a frame offset that is obtained by subtracting a generation time of the output frame from a maximum delay time of the distributed translator.

10. An operating method of a distributed translator, the method comprising:
- demodulating a received signal to extract a transport stream;
- reconstructing the transport stream as an output frame;
- transmitting the output frame based on a delay time that is caused by a reconstruction time of the output frame; and
- wherein the output frame is reconstructed based on frame synchronization information of the received signal.

* * * * *